J. DUDLEY.
FILLING MACHINE.
APPLICATION FILED MAR. 4, 1912.

1,065,789.

Patented June 24, 1913.
5 SHEETS—SHEET 1.

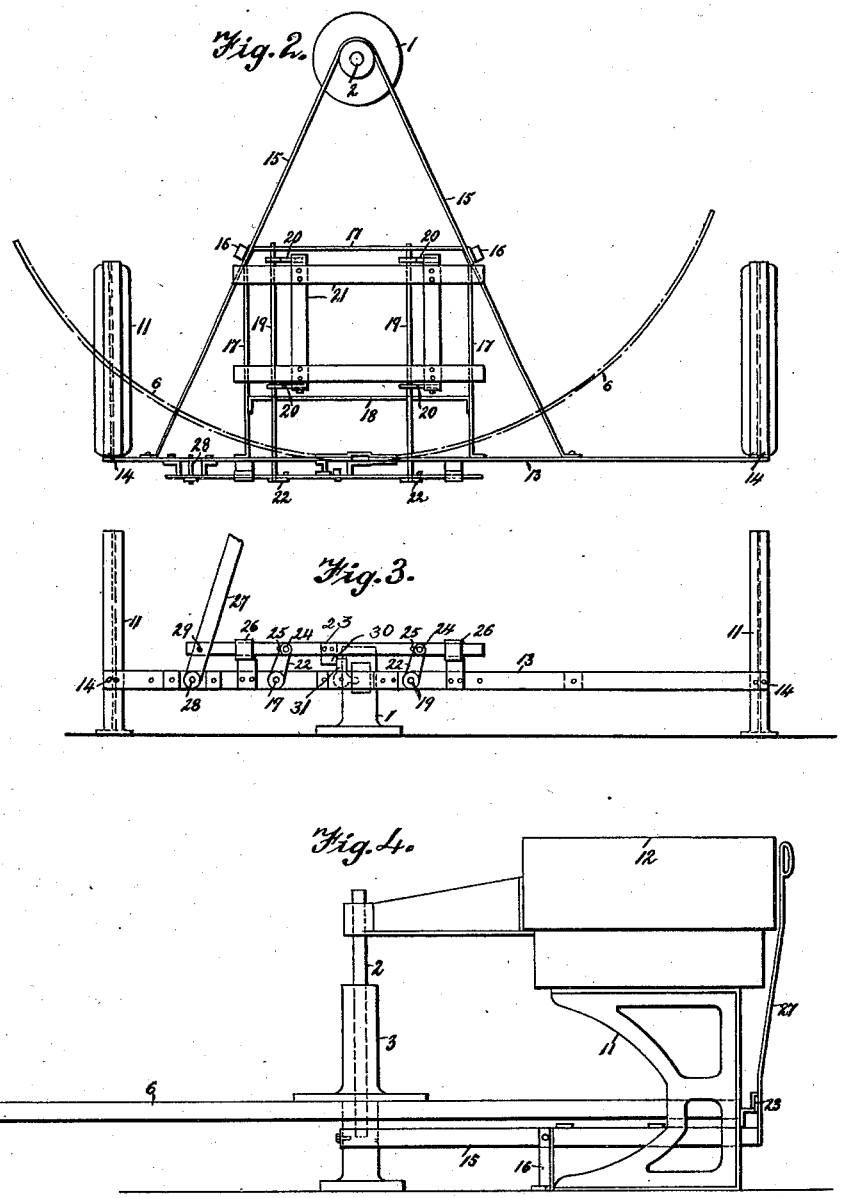

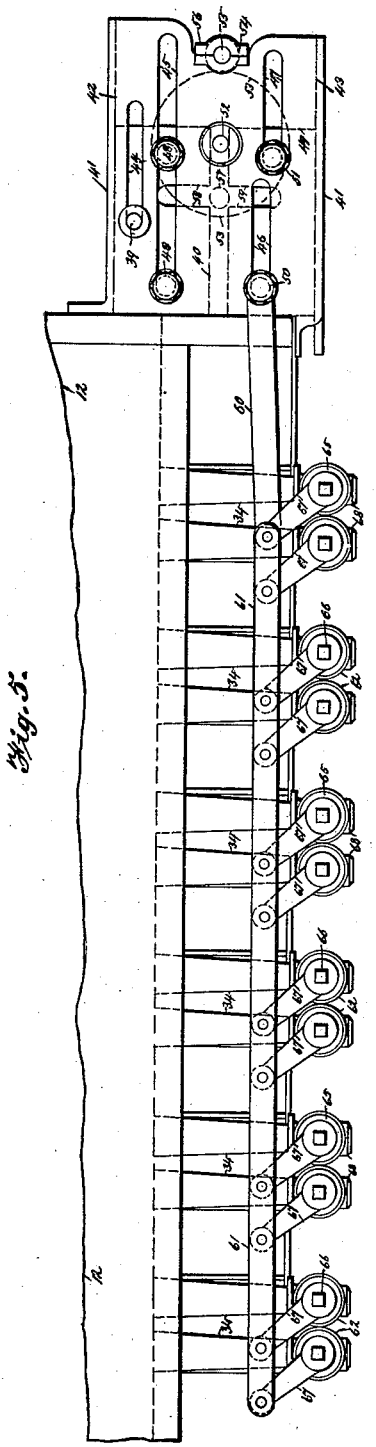

J. DUDLEY.
FILLING MACHINE.
APPLICATION FILED MAR. 4, 1912.

1,065,789.

Patented June 24, 1913.

5 SHEETS—SHEET 4.

J. DUDLEY.
FILLING MACHINE.
APPLICATION FILED MAR. 4, 1912.
1,065,789.
Patented June 24, 1913.
5 SHEETS—SHEET 5.
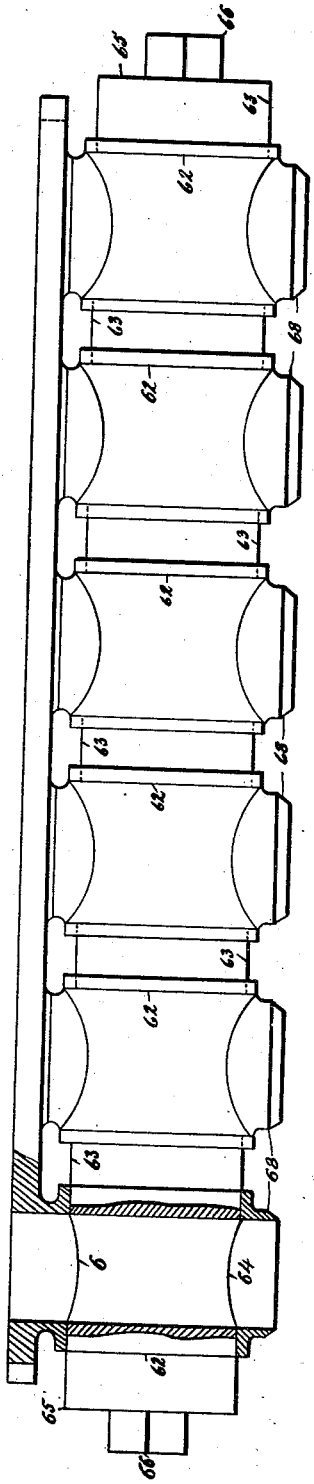
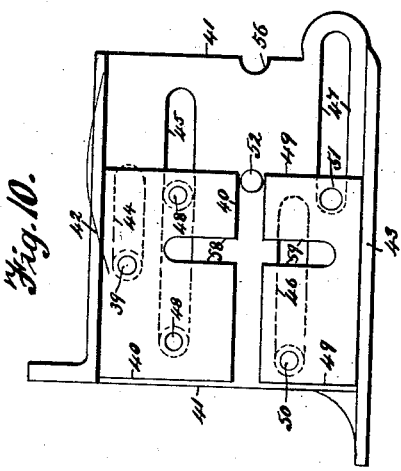
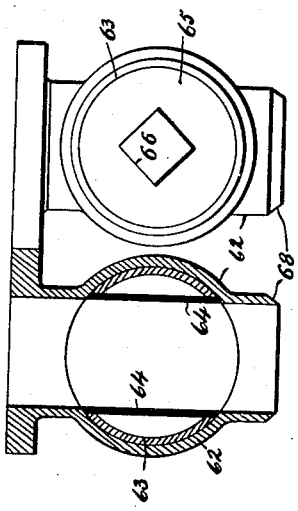
Witnesses
S Burgess
Ra T Gee
Inventor
Job Dudley
By Alfred T Bratton
attorney.

UNITED STATES PATENT OFFICE.

JOB DUDLEY, OF HAMILTON, ONTARIO, CANADA, ASSIGNOR, BY DIRECT AND MESNE ASSIGNMENTS, TO THE SMITH, DUDLEY, STUART COMPANY, LIMITED, OF BURLINGTON, ONTARIO, CANADA.

FILLING-MACHINE.

1,065,789.   Specification of Letters Patent.   Patented June 24, 1913.

Application filed March 4, 1912. Serial No. 681,604.

*To all whom it may concern:*

Be it known that I, JOB DUDLEY, a citizen of the Dominion of Canada, residing at 498 Main street east, in the city of Hamilton, in the county of Wentworth, in the Province of Ontario, Dominion of Canada, have invented certain new and useful Improvements in Filling-Machines, of which the following is a specification.

The invention relates to machines for filling vessels or containers with predetermined or measured quantities of any commodity and it has more particular reference to that type of machine for filling semi-fluid or glutinous substances into jars, vessels or the like.

The main object of my invention is to provide an improved construction of filling machine which will in its operation enable the vessels or containers to be filled rapidly and without waste or injury.

A further object is to provide improved means for accurately measuring the quantity of substance filled, as well as insure the prompt flow of said substance to the series of vessels or containers to be filled so soon as said vessels or containers are adjusted to the filling position.

Another object is to provide an improved means whereby the inlet from the vat or tank is positively closed before the outlet to the vessels or containers to be filled is opened, and vice versa.

A still further object is to provide a conveyer which is adapted to lift the series of vessels or containers up to the measures for the purpose of filling.

To these and other ends, the invention consists in certain improvements, and combinations and arrangements of parts, all as will be hereinafter more fully described, and the novel features whereof are particularly pointed out in the appended claims.

Reference is to be had as the description proceeds to the accompanying sheets of drawings which illustrate my invention and in which similar characters designate the same parts throughout all the figures.

Figure 1:
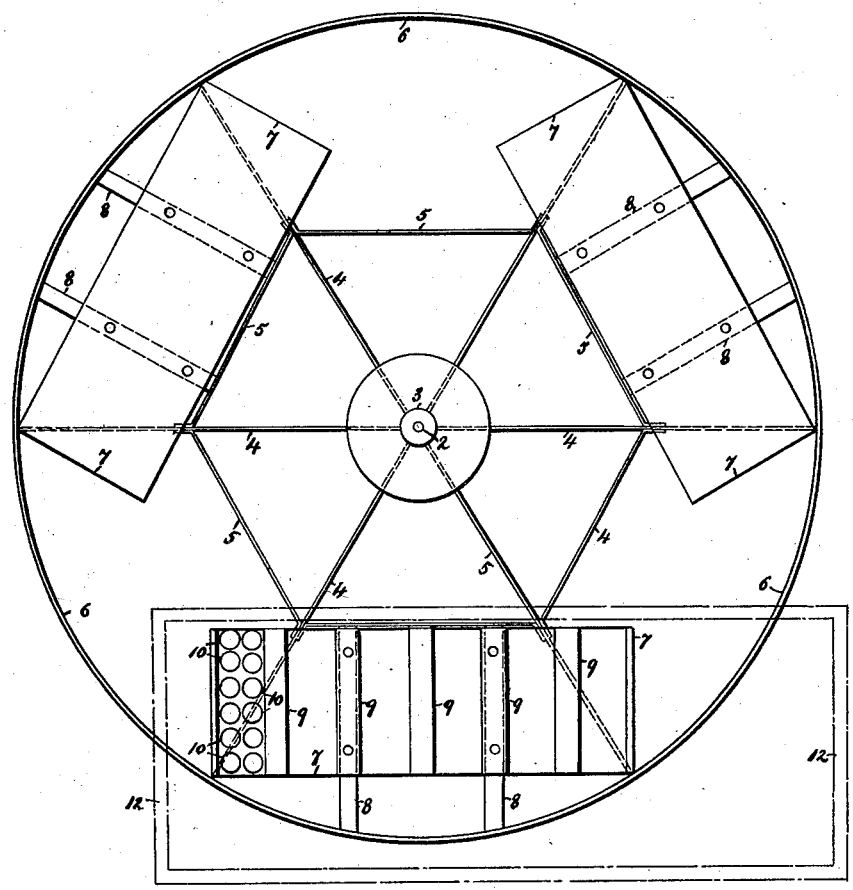
Figure 6:
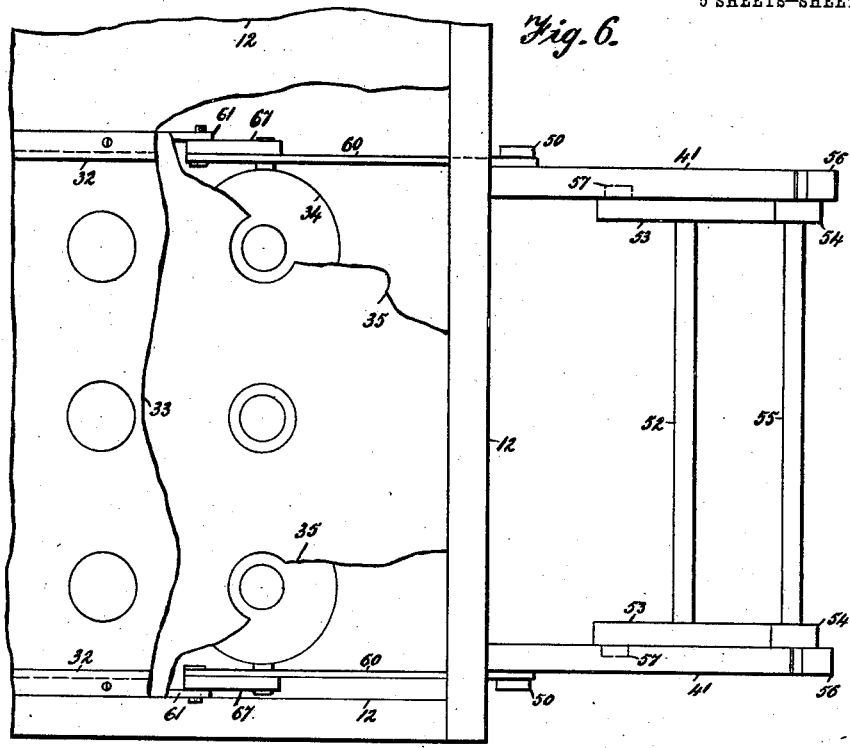
Figure 7:
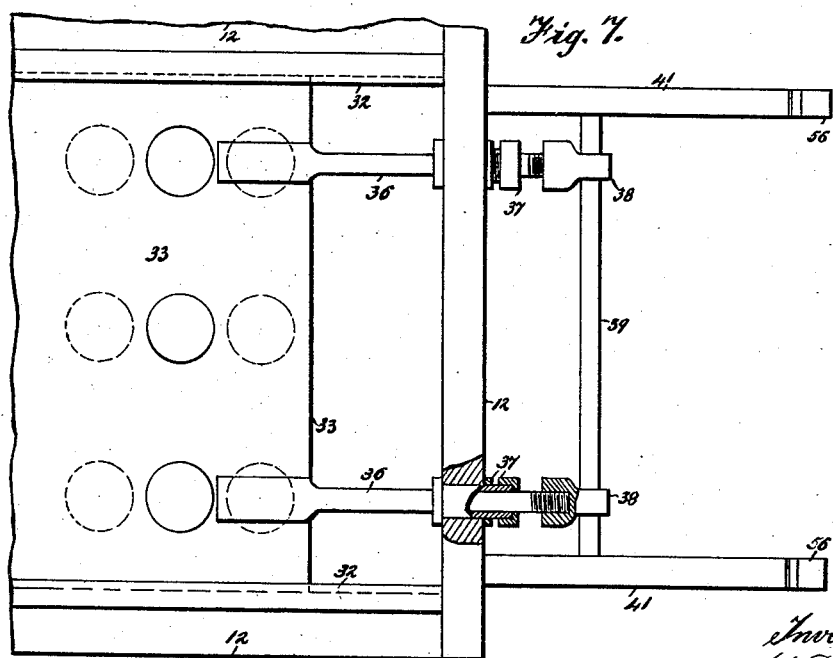

Figure 1, is a diagrammatic plan of a filling machine embodying my improvements parts being removed for the sake of clearness. Fig. 2, is plan of the rotary table supporting means and its elevating mechanism. Fig. 3, is a front elevation of the same. Fig. 4, is a side elevation of Fig. 2. Fig. 5, is an enlarged detail view of the lower part of the cooling vat measuring valves and their operating mechanism. Fig. 6, is a plan view of the same with parts broken away or in section for the sake of clearness. Fig. 7, is a similar plan to the preceding figure showing the connections for operating the sliding bottom of the cooling vat. Fig. 8, is an enlarged detail view of one set of valves and hereinafter more specifically referred to. Fig. 9, is a detail end view of two rows of valves in accordance with the preceding figure. Fig. 10, is a detail hereinafter fully described.

According to the embodiment of my invention illustrated which diagrammatically illustrates a machine adapted for filling five pound jars with jam, and referring more particularly to Figs. 1 to 4, inclusive, 1, is a supporting standard or base, which is recessed in its upper part to form a support for the lower end of a vertical shaft or pillar 2. Mounted on and adapted to be rotated about the shaft 2, is a flanged sleeve 3, to the lower part of which is secured in any of the well known ways a skeleton framework, appropriately consisting of radially disposed bars 4, 4, connected rigidly together by tie-pieces 5, 5, and an encircling or circumferential bounding 6. At predetermined and equal distances apart on the upper surface of the aforesaid table or skeleton framework I arrange three—for example—movable tables 7, 7, supported on spaced bearers 8, 8, secured to the bounding 6, and tie-pieces 5, 5, all of which will be readily comprehended on an examination of the drawings. Each table 7, (Fig. 1) is preferably divided by spaced divisions 9, 9, into a series of compartments each of which is adapted to receive one dozen—for example—five pound jars 10, 10, arranged in a skeleton case of the well known type and adapted to compactly contain said dozen jars for easy handling in bulk.

11, 11, Figs. 2, 3, and 4, are strong spaced standards on which is supported the vat or jam cooler 12, constructed from suitable material and lined with sheet copper. These standards 11, 11, may be fixed to the floor in any convenient manner and they are connected together by a spacing bar 13, bolted or riveted thereto at 14, 14.

15, is a bent strap or radial bar connecting the bar 13, rigidly to the supporting standard 1, aforesaid, and 16, 16, are supporting feet carried thereby.

17, 17, 17, is a skeleton frame secured rigidly between the bent strap 15, 15, and the spacing bar 13, and it is provided with a cross bearer 18. Transversely and horizontally in the frame 17, I mount oscillatory shafts or spindles 19, 19, carrying crank arms 20, 20, which support on their free ends a skeleton platform 21, 21, for the purpose hereafter to be explained. The outer ends of the shafts 19, 19, are fitted with crank levers 22, 22, which in turn are connected to a bar 23, their points of connection therewith being through the medium of pins 24, 24, operable in slots 25, 25, therein. This bar 23, is mounted in vertically slotted guide brackets 26, 26, carried by the aforesaid spacing bar 13, and it is adapted for vertical and lateral movement by means of a hand lever 27, pivoted at 28, on the spacing bar 13, and at 29, to the said bar 23. Thus it will be seen that by moving the lever to the right hand in Fig. 3, the bar 23, will be lowered and through the connections 22, 22, 19, 19, 20, 20, will lower the skeleton platform 21. A reverse movement of the hand-lever 27, will raise the platform 21, and it will be readily understood that when one of the tables 7, is moved over said platform 21, it can be raised and lowered thereby.

Any appropriate catch or locking means 30, 31, is provided for limiting the movement of the bar 23; and it is to be understood that a spring latch of any well known pattern is fitted in connection with the bounding 6, to arrest its movement when each table 7, is brought into position over the platform 21, said latch being manually or mechanically operable.

Referring now more particularly to Figs. 5 to 9 inclusive, the jam cooler 12, is fitted longitudinally on the inner face of its bottom with flanged guides, 32, 32, which house a perforated shutter or slide 33, which is adapted, as hereafter explained, to open communication with the measure 34, 34, suitably mounted beneath said cooler 12. Obviously the bottom 35, of the cooler 12, is similarly perforated to the slide 33, and in order to open communication with the measures at the proper periods I attach to said slide draw rods or tubes 36, 36, (Fig. 7) passed through stuffing-boxes or glands 37, 37, provided for the purpose in the one end of the cooler 12. The outer ends of the draw rods 36, 36, are connected by couplers 38, 38, to a rod 39, which in turn is connected to the upper slides 40, Fig. 10,— which is an enlarged detail of the inside of one of the side brackets 41, 41,—carrying the operating mechanism, now to be described. These side brackets 41, 41, are furnished with upper and lower laterally projecting flanges 42, 43, respectively, and upper and lower horizontal slots 44, 45, 46, 47. The upper slides 40, 40, are supported *in situ* in the side brackets 41, 41, by studs or pins 48, 48, fitted with anti-friction rollers passing through and working in the slots 45, while the rod 39, is connected through said slides and similarly fitted into the slot 44. 49, represents the lower slides fitting on the inner sides of the brackets 41, 41, and they are guided and held in place by studs 50, 51, fitted with anti-friction rollers as above described. Transversely between the bracket 41, 41, I mount a freely revoluble shaft 52, which has keyed thereon gear wheels 53, 53, meshing with pinions 54, 54, carried by and fixed to a second shaft or spindle 55, mounted in appropriate journals 56. One end of this latter shaft or spindle 55, is provided with any suitable hand crank lever, or wheel, whereby it may be given a partial turn in either direction. On the outer face of each gear wheel 53, 53, I provide a stop or stud 57, which lies in the path of vertical grooves, 58, 59, respectively provided in the aforesaid upper and lower slides 40, 49. From the foregoing and on more particular reference to Fig. 5, it will be readily seen that by imparting a partial turn to the gear wheels 53, 53, in a clockwise direction—by reversely turning the spindle 55—the stud 57, will be caused to travel upwardly in the slot 58, until the outer stud 48, contacts with the outer end of the slot 45, which practically means a quarter turn of the wheel 53. A reverse movement of the wheel from the position shown in Fig. 5, will cause the stud 57, to descend into the groove 59, and thereby move the lower slide 49, rearward or outwardly from the cooling vat 12, as will be readily comprehended on a careful examination of the drawings. Attached on the outer ends of the studs 50, 50, are connecting links 60, 60, which are united at their opposite ends to common connecting rods or links 61, 61, which actuate the valves controlling the flow from the measures, 34, 34, above referred to.

62, 62, Figs. 8, and 9, are the casings of the controlling valves above referred to and they are preferably arranged in series of six in number with a common controlling valve 63, which is correspondingly perforated and fitted with diametrical openings or cross connections 64, (Fig. 9), end closures 65, 65, and keys 66, 66. These keys 66, 66, are each fitted with an operating lever 67, (Fig. 5,) which is oscillatorily connected to the above referred to connecting rods 61, 61, in any of the well known ways. The lower ends of the valve casings 62, 62, are appropriately chamfered or tapered-off at 68, to fit the necks or mouths of the vessels or containers to be filled.

From the drawings it will be seen that the form of machine described is adapted to fill 72 jars at one and the same time by being provided with twelve rows of valve casings 62, 62, each containing six separate communications 64, 64, with the measures 34, and the method of attaching said valve casings 62, 62, to the lower ends of said measures 34, will be self evident to those skilled in the art to which my invention appertains. Air relief connections of any well known type are fitted in connection with each valve casing 62, in order that the air forced out of each jar as it is filled may be exhausted; or one common air vent may be provided in connection with each row or series of valve casings 62, 62, by grooving the underside of the sliding plate 33, and fitting thereon in communication with each said row one common air vent tube. Suitable liners or other appropriate attachments may be provided in connection with the measures 34, 34, to readily adapt same to different measures of capacity, whereby the machine can be easily changed to fill vessels or containers of less than the aforementioned content to wit:— five pound jars.

The operation of the machine is briefly as follows: Jam or other substance is fed into the cooler or filler 12, in any of the well known ways. The rotatable or skeleton platform 4, 5, 6, carrying a series of empty vessels or containers on each table 7, is then moved around on its axis, 2, until one of the said tables 7, is brought beneath the cooler 12, and locked in position by the spring catch. As each table 7, is moved into this position the lever 27, is moved over to raise said table and the platform 23, until the necks of the empty vessels or containers are firmly jammed against the valve nozzles 68, 68, above described, and in order to avoid splashing or loss of material. The operator then opens the valves 63 by turning the gear wheel 53, as above set forth, when the measures 34, 34, discharge or empty their contents into the vessels or containers, the air therein contained exhausting in the well known way. When the measures 34, 34, have emptied their contents into the vessels or containers the operator moves the hand crank or wheel controlling the gear wheels, 53, 53, to close the discharge from the measures 34, 34, and at the same time moves the slide 33, to open communication with the vat or cooler 12, as above described. This operation closes all the valves 63, of the measures 34, 34, underneath the vat simultaneously, whereupon the lever 27, is released or thrown back and the table 7, descended. This table 7, and filled vessels or containers are then swung through one-third of a revolution of the bounding 6, which brings into position the succeeding table of empty vessels or containers to be filled. While this table or series of vessels is being filled the preceding series can be readily removed and the third table filled with empty vessels or containers.

Thus it will be seen that by my invention I have devised a machine whereby the triple operations of filling, removing filled, and feeding in a series of empty vessels or containers can be simultaneously carried out with the attendant great saving in time and expense.

The present invention provides an exceedingly simple but effective filling machine for rapidly and expeditiously filling a series of vessels or containers with liquid or semi-liquid commodities, and while it has been specifically so described it will be understood that it is not to be so limited. Furthermore it is obvious that the type of vessel to be filled may be of any appropriate kind, while the flow of the commodity into and out of the measures 34, 34, takes place entirely by gravity, there being no force required to be applied thereon to cause its easy discharge into and through said measures. The machine is also extremely simple and economical in construction, is capable of enormous capacity and is easily manipulated and the various parts being of easy access greatly commends it from a labor saving and sanitary standpoint.

The mechanism for handling the vessels or containers to be fitted is novel and extremely simple and is claimed as invention, and again the means for controlling the measuring and filling of the quantity of measured commodity is claimed as novel, and I wish it understood that either or both may be employed separately or with other handling or filling means respectively.

Obviously the details of construction and the arrangement of the parts may be considerably varied in their several combinations, and various other applications may be had without in any way departing from the field and scope of my invention, and it is intended to include all such within this application wherein only one specific form has been illustrated and described.

Having described my invention, what I claim is:—

1. In a device of the character described, the combination with a vat, of a plurality of rows of measuring chambers leading therefrom, a valve casing mounted upon the bottom of each of said measuring chambers, a plurality of tubular valve members, there being one of said valve members passing through all of the valve casings of a row, means for actuating all of said tubular valve members simultaneously, said means comprising a connecting link, a slide, a slot formed therein, a rotative member, and a pin carried by said rotative member for engaging said slot to actuate said slide.

2. In a device of the character described, the combination with a vat, of a plurality of measuring chambers leading therefrom, of a common controlling slide to all of said measuring chambers located at the upper end thereof, controlling valves located at the lower ends thereof, a common actuating member for all of said controlling valves, a pair of slides to one of which the first named slide is connected, and to the other of which said actuating member is connected, each member of said pair of slides having a vertical slot formed therein, said grooves alining with each other and being formed in adjacent edges of said slide, a rotative member, and a pin carried by said rotative member and adapted to engage in said slots to actuate said slides.

3. In a device of the character described, the combination with a vat, of a plurality of measuring chambers leading therefrom, of a common controlling slide to all of said measuring chambers located at the upper end thereof, controlling valves located at the lower ends thereof, a common actuating member for all of said controlling valves, a pair of slides to one of which the first named slide is connected, and to the other of which said actuating member is connected, each member of said pair of slides having a vertical slot formed therein, said grooves alining with each other and being formed in adjacent edges of said slide, a rotative member, and a pin carried by said rotative member and adapted to engage in said slots to actuate said slides, said measuring chambers being disposed in pairs of rows, and said controlling valves comprising elongated tubular members, each of which serves to control all of the measuring chambers of a row.

Signed at Hamilton, Ontario, Canada, this 15th day of February, 1912.

JOB DUDLEY.

In the presence of—
 ALFRED T. BRATTON,
 GERTIE NICHOLSON.

---

Copies of this patent may be obtained for five cents each, by addressing the "Commissioner of Patents, Washington, D. C."